United States Patent
Suggs

(10) Patent No.: US 6,541,124 B1
(45) Date of Patent: Apr. 1, 2003

(54) DRILL RESISTANT HARD PLATE

(75) Inventor: Donald K. Suggs, Boise, ID (US)

(73) Assignee: Rhino Metals, Inc., Caldwell, ID (US)

( * ) Notice: Subject to any disclaimer, the term of this patent is extended or adjusted under 35 U.S.C. 154(b) by 0 days.

(21) Appl. No.: 10/011,041

(22) Filed: Nov. 13, 2001

(51) Int. Cl.$^7$ ............................ B32B 15/04; B05D 5/02
(52) U.S. Cl. ........................... 428/545; 51/307; 51/309; 109/80; 109/82; 109/85; 427/180; 427/189; 427/190; 427/191; 427/202; 427/205; 428/546; 428/548; 428/558; 428/565; 428/615; 428/627; 428/658; 428/668; 428/674; 428/680; 428/684; 428/686; 428/687; 428/908.8; 428/926; 428/932
(58) Field of Search ................. 428/545, 546, 428/548, 558, 565, 615, 627, 658, 668, 674, 680, 684, 686, 687, 908.8, 926, 932; 427/180, 189, 190, 191, 202, 205; 109/80, 82, 85; 51/307, 309

(56) References Cited

U.S. PATENT DOCUMENTS

| | | | |
|---|---|---|---|
| 3,715,999 A | * 2/1973 | Shwayder | 428/558 |
| 4,173,457 A | 11/1979 | Smith | 51/309 |
| 4,243,727 A | 1/1981 | Wisler et al. | 428/558 |
| 4,859,541 A | 8/1989 | Maxeiner et al. | 428/545 |
| 5,007,326 A | 4/1991 | Gooch, Jr. et al. | 89/36.02 |
| 5,147,996 A | 9/1992 | Carlin | 219/76.14 |
| 5,164,264 A | 11/1992 | Kugimiya et al. | 428/403 |
| 5,250,355 A | 10/1993 | Newman et al. | 428/367 |
| 5,396,041 A | 3/1995 | Miller et al. | 219/76.15 |
| 5,492,186 A | 2/1996 | Overstreet et al. | 175/374 |
| 5,755,299 A | 5/1998 | Langford, Jr. et al. | 175/375 |
| 6,138,779 A | 10/2000 | Boyce | 175/374 |
| RE37,127 E | 4/2001 | Schader et al. | 75/239 |
| 6,248,149 B1 | 6/2001 | Massey et al. | 75/236 |

FOREIGN PATENT DOCUMENTS

DE        211695        7/1980

OTHER PUBLICATIONS

B & W Metals Co., Inc. "Kutrite" Reprinted from the 35th (1982–83) Composite Catalog, (no month).
Harris Welco Soldering, Brazing & Welding Products Certificate of Compliance, Issued Oct. 18, 2001; Harris–Welco, Kings Mountain, NC.

* cited by examiner

Primary Examiner—Robert R. Koehler
(74) Attorney, Agent, or Firm—Robert L. Shaver; Frank J. Dykas; Stephen M. Nipper

(57) ABSTRACT

A drill resistant plate, which presents a rough surface of hardened particles to drilling attack, and which tends to snap or destroy drill bits before they can began drilling. The plate is made by brazing hard particles into a matrix of brazing material attached to a steel plate. Nickel-Silver brazing material is used to form the matrix on the steel plate, and tungsten carbide particles of 8–10 mesh are secured within the matrix, with the hard particles of tungsten carbide partially exposed, presenting a roughened surface with angular pieces of tungsten carbide to the drilling attack.

30 Claims, 3 Drawing Sheets

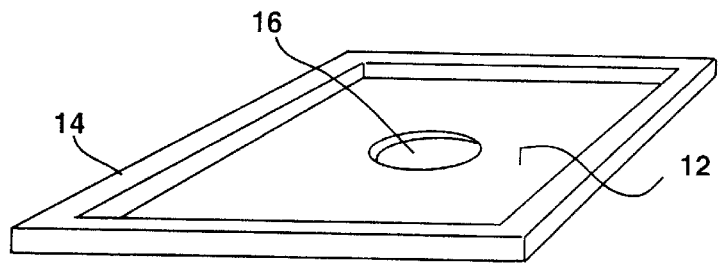
FIG. 1A
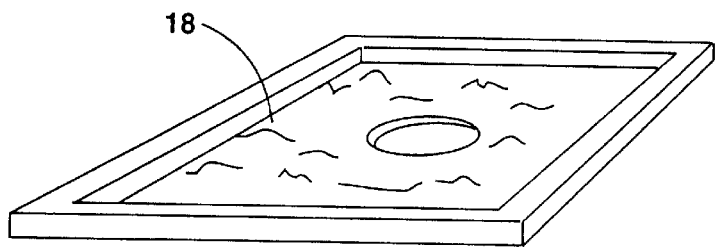
FIG. 1B
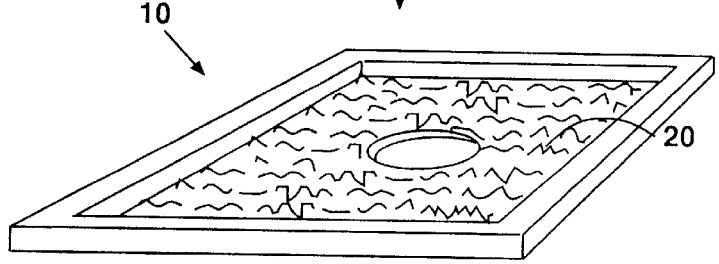
FIG. 1C
FIG. 1

DRILL RESISTANT HARD PLATE

BACKGROUND OF THE INVENTION

1. Field of the Invention

The present invention generally relates to drill resistant, hard material, and more particularly relates to a structure which is braised onto a steel plate for resistance to drilling.

2. Background Information

There is often a need to make a surface harder than steel. This often occurs in the drilling industry in which drill bits need to have extreme hardness and the ability to drill through hard materials. Drill casings also need to have a hardened surface so that they have longer wear against other drill casings. The approach to making an abrasive for better cutting of drill bits is to weld onto the drill bits granules of hardened material such as tungsten carbide.

U.S. Pat. No. 5,396,041, to Miller et al. also provides an approach to making a plate hard to drill. The Miller patent utilizes welding by the tungsten inert gas (TIG) process to embed tungsten carbide particles in a steel matrix. This matrix is specifically structured so that the tungsten carbide particles are positioned in a gradient so that the tungsten carbides are most concentrated at a distance away from the surface of the steel plate. However, the resulting steel plate has a smooth surface of steel, in which a drill bit may begin drilling. As the drill bit proceeds through the plate, it encounters hard particles of tungsten carbide, but it also is stabilized against chattering and vibration by the hole which surrounds it. If the hard particles cause the bit to break, another bit can be started in the same hole, and drilling progress can be made. Furthermore, in the TIG process, the plate and the welding rod must be heated to a high temperature. The steel in a localized area is melted, and the steel of a welding rod is also melted and mixes with the molten steel of the plate steel. This leaves a fairly narrow track of welded material. To cover a plate with such weld tracks is time consuming, and the extreme heating of a localized spot causes severe buckling of the plate.

A further drawback to the Miller process is that the finished product has the tungsten particles embedded in the steel matrix, so they are not visible. It is thus impossible to visually inspect the resultant plate for proper dispersion and coverage of the particles in the plate. The temperature during welding is high enough to weaken the strength of the already brittle tungsten carbide particles.

What is needed is a drill resistant hard plate and a method for making same, which uses a temperature lower than welding, and which causes drill bits to shatter before they can began drilling into the hard plate.

SUMMARY OF THE INVENTION

These and other objects are accomplished by the resistant hard plate of the current invention. The current invention includes a drill resistant hard plate and a method for making the same.

The method for making the drill resistant hard plate includes a first step of providing a steel base plate. In the broadest form of the invention, the next step is to attach hard particles to the steel base plate. This can be attachment by any material which forms a matrix that binds the hard particles to the steel base plate. This could include a matrix of epoxy, a sufficiently strong adhesive, or molten metal, including solder.

One version of the process of the invention involves using a material which involves molten metal. The next step in this process is to preheat the steel base plate. The next step is applying a brazing material to the preheated steel base plate, so that the steel base plate is covered by the brazing material. The next step is applying a layer of hard particles on the heated and braised steel base plate, so that the hard particles blend with the brazing materials and are bound to the steel base plate. They can also be partially covered with a layer of the brazing material, or partially embedded in the brazing material. This forms a layer of hard particles, with one side of the particles adjacent to the steel base plate, and with the other side of the hard particles forming a rough, angular surface, in which the hard particles are firmly bound by the brazing material. The next step is allowing the steel base plate, the hard particles and the brazing material to cool. When cooled, a drill resistant surface is the result. The drill resistant surface of the invention has exposed angular particles, which are the partially exposed hard particles, bound in a hard matrix. Because the surface is rough and it is formed of angular particles, there is no flat surface to serve as a starting point for a drill bit, thus when a drill is pressed into the rough surface, it can find no purchase, and this causes it to "walk". While it is "walking" and turning, the drill bit is likely to encounter the sharp edges and corners of the hard particles, which will catch the drill bit and cause it to break.

One way of constructing the drill resistant hard plate is so that the layer of hard particles is a monolayer, and is generally one particle in depth. The hard particles can be applied using a brazing rod containing the hard particles and a first brazing material, and using a second brazing material to help bind the hard particles and the first brazing material to the steel base plate. The second brazing material melts under applied heat, and forms a matrix binding the hard particles to the steel base plate and the first brazing material. In this way, the first and second brazing material blend together to form the matrix, and the matrix binds the hard particles, and may partially cover them. The hard particles can be one thirty-second to one-half inch ($\frac{1}{32}$–$\frac{1}{2}$") in thickness, but other thickness such as one-sixteenth to one-quarter inch ($\frac{1}{16}$–$\frac{1}{4}$") thick have also been found to be suitable. A thickness of approximately one-eighth inch ($\frac{1}{8}$") has proven to be an optimal thickness for the layer of hard particles. The optimal size of the hard particles is related to the size of the drill bit to be defeated.

The hard particles can be made from a variety of substances such as tungsten carbide, titanium nitride, tantalum carbide, zirconium carbide, alumina, beryllium carbide, titanium carbide, silicon carbide, aluminum boride, or boron carbide. The hard particles can be from twenty-four (24) to six (6) mesh in size, and an optimum range is eighteen (18) to ten (10) mesh in size.

The first brazing material can be from a number of substances, but a suitable one is a nickel-copper zinc brazing material. One acceptable combination of these elements for a brazing rod is the combination of approximately ten percent (10%) nickel, forty-eight percent (48%) copper, and forty-two percent (42%) zinc. The second brazing material, which comprises the rod in which hard particles are delivered to the steel base plate, is nickel silver.

The invention also includes the drill resistant hard plate itself, separate from the method of making the hard plate. The drill resistant hard plate comprises a steel base plate, which serves as a support for the drill resistant hard plate. On one side of the steel base plate is located an anti-drill layer, which has an outward facing surface. The anti-drill layer is bonded to the steel base plate by epoxy, brazing material, or other binding material. The anti-drill layer comprises a layer or monolayer of hard particles which are attached to the steel base plate, and in which at least some of the particles are in contact with the steel base plate on one side, and in which the hard particles are at least partially exposed on the outward facing surface of the anti-drill layer. The outward facing surface of the anti-drill layer has an angular and uneven texture due to protrusion of the hard particles. This makes the outward facing surface a drill resistant surface with angular particles. Because of the angularity of the surface, there is no flat area for a drill bit to start in. For that reason, a drill bit "walks" and chatters on the surface, and eventually encounters a sharp corner or edge of one of the hard particles, which catches the fluting of the drill bit and causes it to break.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

FIG. 1A is a perspective view of the steel base plate.

FIG. 1B is a perspective view of the steel base plate to which brazing has been applied.

FIG. 1C is a perspective view of the steel base plate to which hard particles have been added.

DESCRIPTION OF THE PREFERRED EMBODIMENTS

Figure 2:
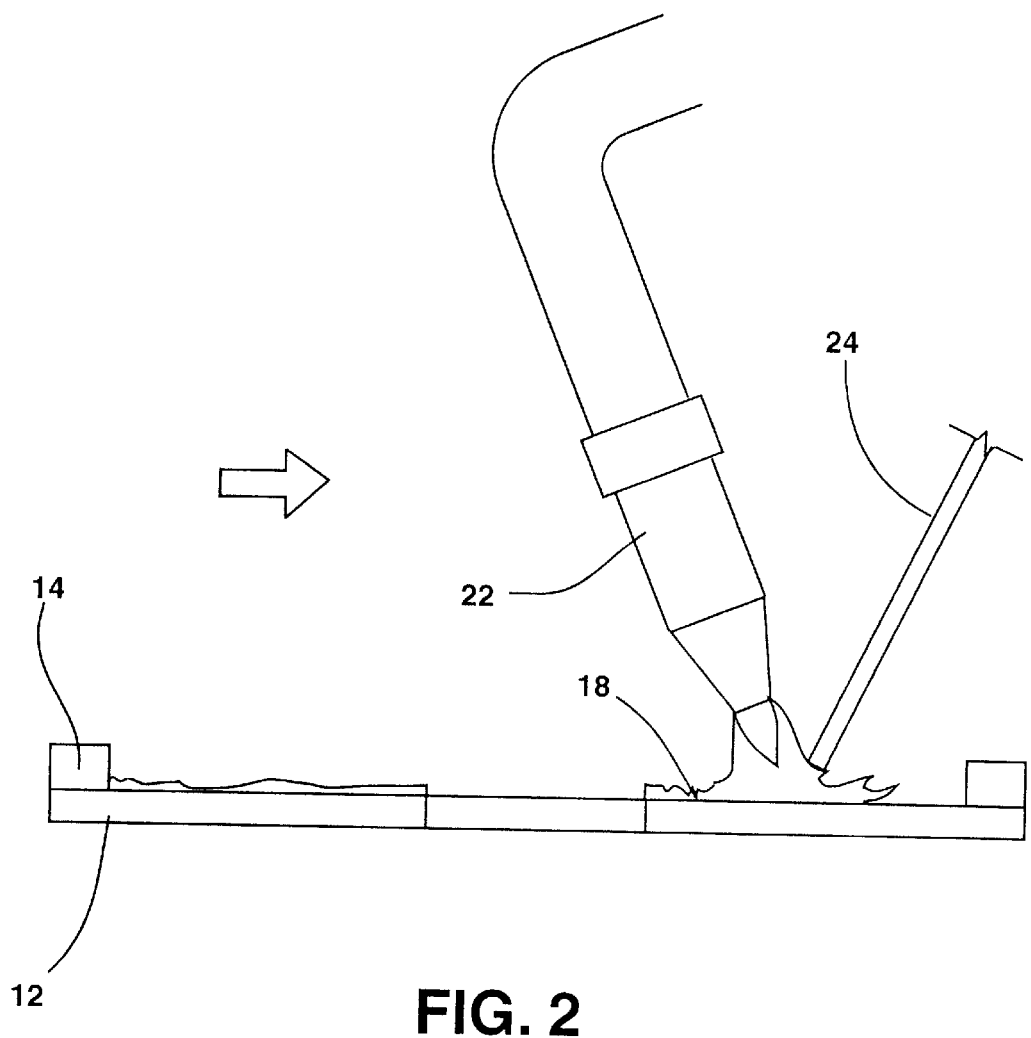
FIG. 2 is a side view of the brazing step.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 3:
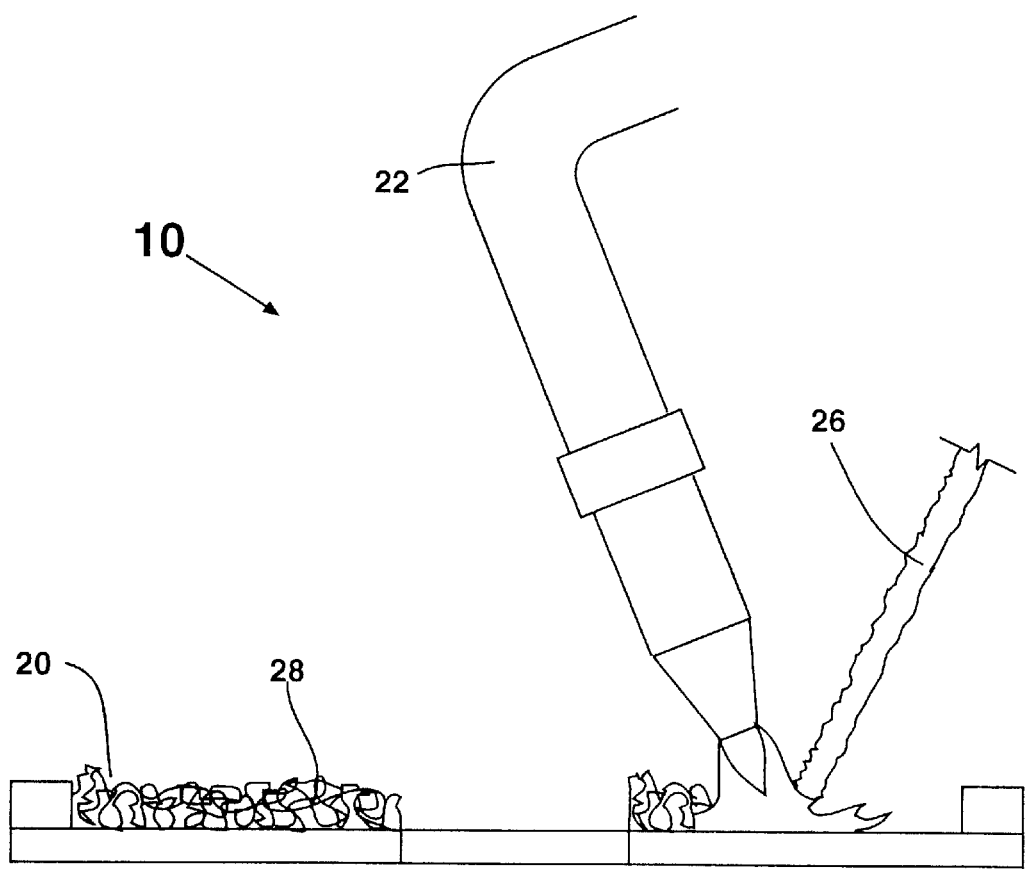
FIG. 3 is a side view of the step of adding hard particles.

FIGS. 1 through 3 show a preferred method of making the drill resistant hard plate. FIG. 1C shows one embodiment of the finished drill resistant hard plate. FIG. 1A shows a steel base plate 12. The steel base plate 12 can take a number of configurations and sizes. This particular configuration of the steel base plate 12 is of mild steel of ten gauge thickness. The perimeter of the steel base plate 12 has a rim 14 which is useful in the manufacturing process, but which is not an essential feature of the design. This particular drill resistant hard plate 10 also has a shaft hole 16, which is for the passage of the handle shaft of a safe. Other drill resistant hard plates 10 might not need any kind of a hole 16 and could be simply a flat plate without any holes. FIG. 1B shows an intermediate step in the process of making the drill resistant hard plate. That step involves adding a material to the steel base plate in which hard particles will be embedded. This material could be epoxy, a sufficiently strong adhesive, or a brazing material. If a brazing material is used, the selected brazing material is added to the steel base plate 12 by the application of heat to the steel base plate 12 and the brazing material 18. FIG. 1C shows the drill resistant hard plate in its finished state, with hard particles 20 embedded in the brazing material 18 on the steel base plate 12. FIGS. 2 and 3 show the process in more detail.

In the preferred embodiment of the invention, drill resistant hard plate 10 is made by the process shown in FIGS. 1, 2, and 3. FIG. 2 shows a steel base plate 12 to which has been attached a steel rim 14. The steel rim 14 is not essential, but is a part of this particular embodiment of the invention. The steel base plate 12 is heated in this case by an oxy-acetylene torch 22 until the metal is a dull cherry red. The torch is moved from one side of the steel base plate 12 to another, in the direction of travel shown by the arrow in FIG. 2. When the steel base plate 12 is at the temperature indicated by a dull cherry red, a brazing rod 24 is applied to the heated region, and brazing material 18 flows onto the steel base plate 12, forming a thin layer of brazing material 18 on the steel base plate 12. The entire plate may be heated to this temperature, or just a portion of it at a time can be so heated. A number of brazing materials are suitable, but a preferred material is made by Harris Welco, and is No. 017FC80, $3/16''$ diameter flux coated nickel-silver brazing rod. The chemical composition of this brazing rod includes approximately ten percent (10%) nickel, forty-eight percent (48%) copper and forty-two percent (42%) zinc. The brazing material shown in FIG. 2 is called the second brazing material, because in some versions of the process, it can be omitted and just a first brazing material may be used.

After the second brazing material 18 has been applied to the steel base plate 12, and preferably before the steel base plate 12 has cooled, the process shown in FIG. 3 is started. As shown in FIG. 3, the steel base plate with second brazing material is heated by the oxy-acetylene torch 22 until the second brazing material begins to flow. Onto a region thus heated, a brazing rod composed of the first brazing material is applied. This step involves applying a brazing rod which contains a first brazing material which preferably binds together the selected hard particles. Although a number of different brazing materials and hard particles are suitable for this step of the process, a particularly favorable material is a rod containing sintered tungsten carbide particles with a grain size of ten (10) to eighteen (18) mesh. A particle containing brazing rod 26 containing these tungsten carbide particles and a first brazing material is applied to the heated region as shown in FIG. 3. This results in a layer 28 of hard particles of tungsten carbide which are bonded together and to the steel base plate by the second brazing material 18 and the first brazing material in the brazing rod 26. These two brazing materials can be the same material or materials of different compositions. In the preferred embodiment, the hard particles 20 are bonding together in a layer, with one side of the particles adjacent to the steel base plate, and with the other side of the particles exposed, and partially covered by brazing material 18 and a second brazing material which was contained in the particle containing brazing rod 26.

This process results in a drill resistant hard plate 10 which has a rough side exposed, in which hard particles of tungsten carbide are revealed with angular surfaces and sharp corners and angles. This surface is placed in an area where drilling is to be discouraged or defeated. This could be inside a safe behind the safe mechanism, or behind the attack points of the safe. The sintered tungsten carbide particles are very hard, being harder than typical steel twist drills. If a steel twist drill strikes the drill resistant hard plate, there is no flat surface for the drill to begin a hole. Instead, the angular pieces of tungsten carbide force the drill bit to "walk" and chatter. Because of the rough surface of the drill resistant hard plate 10 and the angular features of the tungsten carbide particles which are exposed, the cutting edge of a twist drill will immediately encounter one of the hard angular surfaces of the tungsten carbide. At that time, immense pressure is placed on the tungsten carbide particles and the cutting edge of the drill bit. This particular combination of brazing materials has sufficient tensile strength that it resists the torque of the steel twist drill. As a result, the twist drill simply breaks and/or the carbide particles destroy the cutting edge of the drill bit. Either way, the drill is defeated. The strength of the brazing material used in the rod of this embodiment is advertised as having "an ultimate strength of up to 100,00 p.s.i."

Another type of drill bit is also defeated by this drill hard plate and that is a steel drill bit in which the cutting edges of the drill have been coated with tungsten carbide or some other hardened coating. These are higher quality bits due to the extra hardness afforded by the tungsten carbide coating, have increased hardness, cutting power, and increased work life. They are often used for thinner ferrous and non-ferrous metals. The tungsten carbide particles are equally as hard as the tungsten carbide coating of the drill bit, and the brazing material 18 of the invention is sufficiently strong to hold the tungsten carbide particles 20 in place as this type of drill bit is destroyed.

The drill resistant hard plate of the invention is also impervious to a third type of twist drill. That type of twist drill is a twist drill made entirely of tungsten carbide. Such a drill bit is expensive, but is an even better cutting tool. This kind of drill bit is used in machine shops for cutting steel, because it can be operated at higher speeds. The tungsten carbide, although very hard, has the characteristic of being brittle. When a drill bit made entirely of tungsten carbide encounters the tungsten carbide particles 20 of the invention, it also shatters.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

I claim:

1. A method for making a drill resistant hard plate comprising:
   providing a steel base plate;
   attaching a layer of hard particles to said steel base plate, thus providing a drill resistant surface with an angular surface comprised of angular particles, so that a drill bit can find no flat starting point and said angular particles catch and break a drill bit or deform the cutting flutes sufficiently to render the drill bit useless.

2. A method for making a drill resistant hard plate comprising:
   providing a steel base plate;
   heating said steel base plate;
   applying a layer of hard particles and a first brazing material on said heated steel base plate, so that said hard particles blend with said first brazing material and said hard particles are bound in a layer of said first brazing material, with said hard particles adjacent to said steel base plate on a base side, and on a top side forming a rough surface comprising said hard particles at least partially covered and bound by first brazing material; and
   allowing said steel base plate and said hard particles and said first brazing material to cool, thus providing a drill resistant surface with angular particles, so that a drill bit can find no flat starting point and said sharp corners of said hard particles catch and break a drill bit.

3. The method for making a drill resistant hard plate of claim 2 in which said heating step further comprises heating said steel base plate until said first brazing material melts and bonds to said steel plate.

4. The method for making a drill resistant hard plate of claim 2 which further includes the step of heating said steel base plate in its entirety, and said first brazing material in a powdered form to said steel base plate, and applying said hard particles.

5. The method for making a drill resistant hard plate of claim 2 which further includes the step of preheating said steel base plate before a specific area of said steel base plate is heated for application of said hard particles and said first brazing material.

6. The method for making a drill resistant hard plate of claim 2 in which said step of forming a layer of hard particles results in a monolayer of hard particles.

7. The method for making a drill resistant hard plate of claim 2 which includes the step of applying hard particles from a rod made of said first brazing material which melts under heat.

8. The method for making a drill resistant hard plate of claim 7 in which the step of applying hard particles from a rod further includes melting said rod so that said first brazing material forms a matrix for said hard particles, and holds said hard particles in place on said steel base plate.

9. The method for making a drill resistant hard plate of claim 2 in which said layer of hard particles is $\frac{1}{32}$ to $\frac{1}{2}$ inch thick.

10. The method for making a drill resistant hard plate of claim 2 in which said layer of hard particles is $\frac{1}{16}$ to $\frac{1}{4}$ inch thick.

11. The method for making a drill resistant hard plate of claim 2 in which said layer of hard particles is approximately $\frac{1}{8}$ inch thick.

12. The method for making a drill resistant hard plate of claim 2 in which said hard particles are tungsten carbide particles.

13. The method for making a drill resistant hard plate of claim 12 in which said tungsten carbide particles are 24 to 6 mesh.

14. The method for making a drill resistant hard plate of claim 12 in which said tungsten carbide particles are 18 to 10 mesh.

15. The method of making a drill resistant hard plate of claim 12 in which said tungsten carbide particles are applied in the form of a brazing rod containing said tungsten carbide particles.

16. The method for making a drill resistant hard plate of claim 2 which further includes the step of applying a second brazing material to said steel base plate before said hard particles and said first brazing material is applied.

17. The method for making a drill resistant hard plate of claim 16 which further includes the step of applying a first brazing material which is a nickel silver alloy.

18. The method for making a drill resistant hard plate of claim 16 in which said second brazing material is a nickel copper zinc brazing material.

19. The method for making a drill resistant hard plate of claim 18 in which said second brazing material contains approximately 10% nickel, 48% copper, 42% zinc.

20. A method for making a drill resistant hard plate comprising:

providing a steel base plate;

preheating said steel base plate;

applying a second brazing material comprised of nickel, copper, and zinc, to said steel base plate, so that said steel base plate is covered by said second brazing material;

heating a portion of said steel base plate until it is cherry red and placing a layer approximately ⅛ inch thick of tungsten carbide particles on said steel base plate by melting a brazing rod containing 10–18 mesh tungsten carbide particles and a nickel silver first brazing material to said heated portion, so that said hard particles blend with said first and said second brazing material and said tungsten carbide particles are at least partially covered with a thin layer of said first and second brazing material, forming a layer of tungsten carbide particles at least partially covered with said first and second brazing material, with said tungsten carbide particles adjacent to said steel base plate and on a base side touching said steel base plate, and on a top side forming a rough surface comprising said tungsten carbide particles at least partially covered and bound by said first and said second brazing material; and allowing said steel base plate and said hard particles and said first and second brazing material to cool, thus providing a drill resistant surface with exposed angular particles, so that a drill bit can find no flat starting point and sharp corners of said hard particles tend to catch and break a drill bit.

21. A drill resistant hard plate comprising:

a steel base plate, which serves as a support for said drill resistant hard plate;

an anti-drill layer with an outward facing surface, bonded to said steel base plate, which comprises a plurality of hard particles attached to said steel base plate in a position adjacent to said steel base plate and a non-steel matrix sufficiently hard as to resist a force from a drill bit, for binding said layer of hard particles together and to said steel base plate, and at least partially covering said hard particles, in which said outward facing surface of said anti-drill layer has an uneven texture due to partial protrusion of said hard particles, so that said outward facing surface is a drill resistant surface with angular particles, with no flat area for a drill bit to start in, and so that sharp corners of said hard particles are configured to catch and break a drill bit.

22. The drill resistant hard plate of claim 21 in which said hard particles are comprised of particles of tungsten carbide.

23. The drill resistant hard plate of claim 21 in which said anti-drill layer of hard particles is 1/32 to ½ inch thick.

24. The drill resistant hard plate of claim 21 in which said anti-drill layer of hard particles is 1/16 to ¼ inch thick.

25. The drill resistant hard plate of claim 21 in which said anti-drill layer of hard particles is approximately ⅛ inch thick.

26. The drill resistant hard plate of claim 21 in which said granules of tungsten carbide have a mesh size of 24 to 6.

27. The drill resistant hard plate of claim 21 in which said granules of tungsten carbide have a mesh size of 18 to 10.

28. The drill resistant hard plate of claim 21 in which said granules of tungsten carbide have a mesh size of 10–18.

29. The drill resistant hard plate of claim 21 in which said matrix of non-ferrous metal further comprises a mixture of nickel and silver.

30. A drill resistant hard plate comprising:

a steel base plate, which serves as a support for said drill resistant hard plate; an anti-drill layer approximately ⅛ inch thick, which includes an outward facing surface, bonded to said steel base plate, which comprises a plurality of tungsten carbide particles with a mesh size of 10–18, attached to said steel base plate in a position adjacent to said steel base plate, and a matrix of nickel silver, for binding said layer of tungsten carbide particles together and to said steel base plate, and at least partially covering said hard particles, in which said outward facing surface of said anti-drill layer has an uneven surface due to partial protrusion of said hard particles from said matrix, so that said outward facing surface is a drill resistant surface with angular particles, with no flat area for a drill bit to start in, and configured so that sharp corners of said hard particles tend to catch and break a drill bit.

\* \* \* \* \*